(12) United States Patent
Pal

(10) Patent No.: US 9,467,023 B2
(45) Date of Patent: Oct. 11, 2016

(54) LIQUID COOLED MOTOR FOR CABIN AIR COMPRESSOR

(71) Applicant: Hamilton Sundstrand Corporation, Charlotte, NC (US)

(72) Inventor: Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 534 days.

(21) Appl. No.: 13/954,693

(22) Filed: Jul. 30, 2013

(65) Prior Publication Data

US 2015/0035392 A1 Feb. 5, 2015

(51) Int. Cl.
*H02K 9/197* (2006.01)
*H02K 5/20* (2006.01)
*H02K 7/14* (2006.01)
*H02K 9/19* (2006.01)
*B64D 13/00* (2006.01)
*B64D 13/06* (2006.01)

(52) U.S. Cl.
CPC .............. *H02K 9/197* (2013.01); *B64D 13/00* (2013.01); *H02K 5/20* (2013.01); *H02K 7/14* (2013.01); *H02K 9/19* (2013.01); *B64D 2013/0614* (2013.01); *B64D 2013/0644* (2013.01); *Y02T 50/56* (2013.01); *Y10T 29/4935* (2015.01)

(58) Field of Classification Search
CPC .......... H02K 9/197; H02K 5/20; H02K 7/14; H02K 9/19; B64D 13/00; B64D 2013/0614; B64D 2013/0644; Y10T 29/4935; Y02T 50/56
USPC .......................................................... 310/54
See application file for complete search history.

(56) References Cited

U.S. PATENT DOCUMENTS

| | | | | |
|---|---|---|---|---|
| 1,793,434 A * | 2/1931 | Titus | ........................ | H02K 1/20 310/54 |
| 2,618,756 A * | 11/1952 | Fechheimer | ........... | H02K 9/005 188/264 D |
| 3,675,056 A * | 7/1972 | Lenz | ........................ | H02K 9/20 174/DIG. 19 |
| 4,217,171 A * | 8/1980 | Schaffer | .................... | H05H 1/52 310/10 |
| 5,263,068 A * | 11/1993 | Dahl | ...................... | H02K 44/06 310/11 |
| 5,440,600 A * | 8/1995 | Fanning | .................... | H02K 1/12 310/11 |
| 5,473,207 A * | 12/1995 | Hopeck | .................... | H02K 9/19 310/54 |
| 5,530,308 A * | 6/1996 | Fanning | .................... | H02K 1/12 310/179 |
| 5,560,398 A * | 10/1996 | Pfleger | ..................... | F16L 11/12 138/121 |
| 5,642,011 A * | 6/1997 | Fanning | .................... | H02K 1/12 310/11 |
| 5,859,482 A * | 1/1999 | Crowell | .................... | H02K 5/20 310/54 |

(Continued)

FOREIGN PATENT DOCUMENTS

JP         2004194498 A  *  7/2004

*Primary Examiner* — Alex W Mok
(74) *Attorney, Agent, or Firm* — Snell & Wilmer L.L.P.

(57) ABSTRACT

A method of manufacturing a nonconductive liquid cooled back iron heat exchanger to house a conductive cooling liquid is disclosed. This method may include forming layers of material via additive manufacturing to create channels for transporting cooling liquid. The layers may be staggered to create electrically insulated liquid cooling channels. This method may include providing cooling liquid from a power electronics cooling system (PECS) heat exchanger via a pressure drop between the PECS heat exchanger back iron heat exchanger. Also described herein is a liquid cooled stator cooling system, including an aircraft cabin air compressor motor. The motor may include a motor housing and a stator core. A liquid cooled back iron heat exchanger may be positioned between the motor housing and the stator core.

19 Claims, 6 Drawing Sheets

(56) References Cited

U.S. PATENT DOCUMENTS

| | | | | |
|---|---|---|---|---|
| 6,167,721 B1* | 1/2001 | Tsenter | ............... | C09K 5/08 62/259.2 |
| 6,246,134 B1* | 6/2001 | Berrong | ............... | H02K 9/18 310/52 |
| 7,340,899 B1* | 3/2008 | Rubak | ............... | F03G 6/003 60/641.2 |
| 7,508,101 B2* | 3/2009 | Kaminski | ............... | F04D 1/063 310/54 |
| 8,154,157 B2* | 4/2012 | Wiezoreck | ............... | H02K 3/24 310/12.21 |
| 2003/0098143 A1* | 5/2003 | Winkle | ............... | A41D 13/005 165/46 |
| 2005/0061012 A1* | 3/2005 | Zywiak | ............... | B64D 11/04 62/244 |
| 2008/0149313 A1* | 6/2008 | Slaughter | ............... | B22F 3/1055 165/148 |
| 2008/0168796 A1* | 7/2008 | Masoudipour | ............... | H02K 9/19 62/505 |
| 2009/0315415 A1* | 12/2009 | Elnar | ............... | H02K 9/22 310/54 |
| 2010/0102649 A1* | 4/2010 | Cherney | ............... | H02K 1/20 310/54 |
| 2011/0083828 A1* | 4/2011 | Matsunaga | ............... | F04D 29/628 165/104.19 |
| 2011/0272122 A1* | 11/2011 | Corbeil | ............... | B22F 3/002 165/133 |
| 2011/0277888 A1* | 11/2011 | Chun | ............... | C10G 9/203 148/276 |
| 2012/0049665 A1* | 3/2012 | Garriga | ............... | H02K 5/20 310/54 |
| 2012/0262012 A1* | 10/2012 | Kubes | ............... | H02K 5/20 310/54 |
| 2014/0246931 A1* | 9/2014 | Chamberlin | ............... | H02K 9/19 310/54 |
| 2014/0246932 A1* | 9/2014 | Chamberlin | ............... | H02K 9/19 310/54 |
| 2014/0246933 A1* | 9/2014 | Chamberlin | ............... | H02K 9/19 310/54 |

* cited by examiner

LIQUID COOLED MOTOR FOR CABIN AIR COMPRESSOR

FIELD

The present disclosure relates to heat transfer, and more specifically, to the cooling of motors.

BACKGROUND

A dedicated compressor and motor may be configured to pressurize ambient air for use as fresh air in the cabin of an aircraft. The compressor may be, for example, a single stage centrifugal configuration driven by a variable speed permanent magnet motor. Conventionally, this motor may be cooled by an air cooling technique.

SUMMARY

A system and method for a liquid cooled stator cooling system includes a cabin air compressor motor. In various embodiments, the aircraft cabin air compressor motor may include a motor housing and a stator core. A liquid cooled back iron heat exchanger may be positioned between the motor housing and the stator core. The liquid cooled back iron heat exchanger may include a plurality of substantially parallel channels. These channels may be fluidly connected together. The liquid cooled back iron heat exchanger may be electrically nonconductive. The liquid of the liquid cooled back iron heat exchanger may be electrically conductive, such as a propylene glycol water mixture (e.g. DOW FROST), or electrically nonconductive.

According to various embodiments, the liquid of the liquid cooled back iron heat exchanger is provided by a power electronics cooling system ("PECS") heat exchanger. The liquid cooled back iron heat exchanger may be manufactured via an additive manufacturing process. The liquid cooled stator cooling system may not utilize ram air for thermal energy transfer between the liquid cooled back iron heat exchanger and the stator core.

A liquid cooled back iron heat exchanger is disclosed. According to various embodiments, the liquid cooled back iron heat exchanger may comprise a plurality of channels configured to transfer cooling liquid. The plurality channels may be defined by a plurality of additive manufacturing layers, which may be staggered and/or stacked. The liquid cooled back iron heat exchanger may comprise an inlet and an outlet. The inlet and outlet of the liquid cooled back iron heat exchanger may be disengaged via a quick disconnect coupling.

A method of manufacturing a nonconductive liquid cooled back iron heat exchanger to house a conductive cooling liquid is described herein. The method may include forming layers of material via additive manufacturing to create channels for transporting cooling liquid, wherein the layers are staggered to create electrically insulated channels and providing cooling liquid from a power electronics cooling system (PECS) heat exchanger via a pressure drop between the PECS heat exchanger and back iron heat exchanger.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
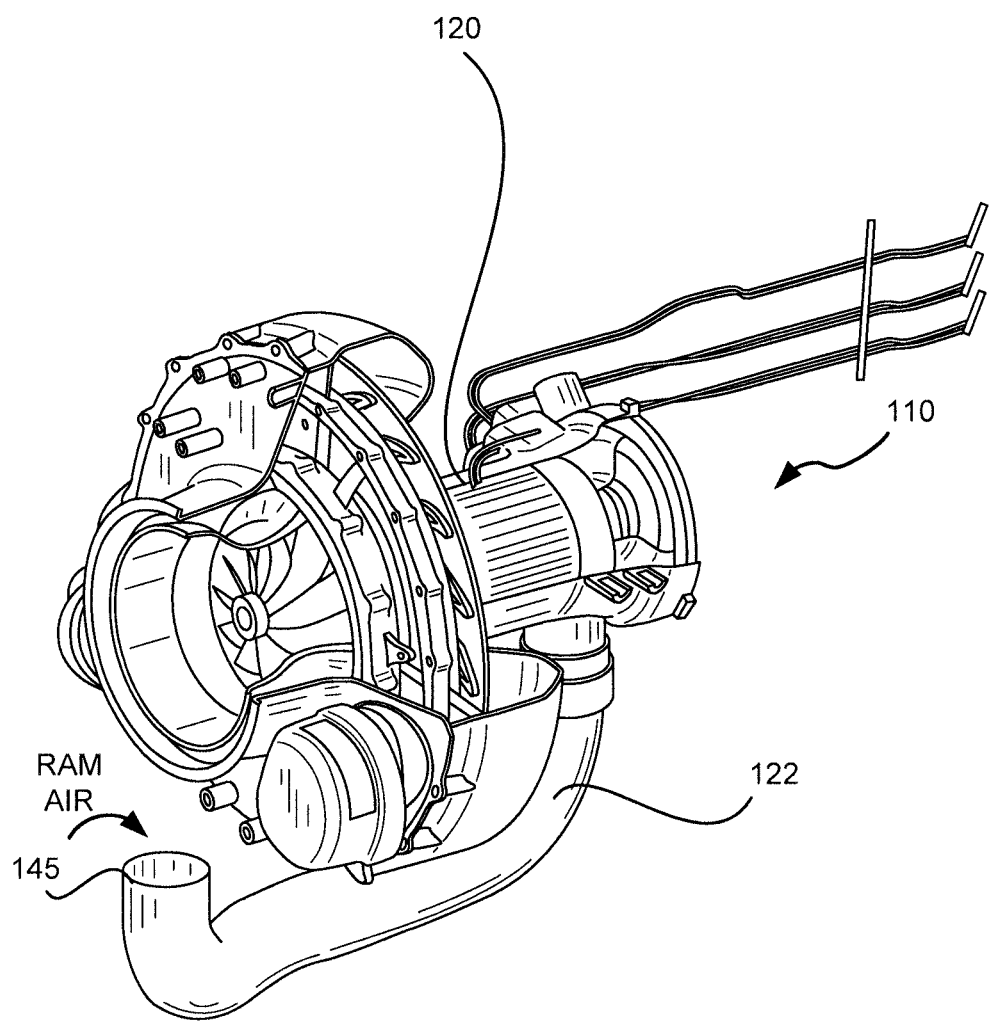
FIG. 1 is a perspective view of a conventional air cooled cabin air compressor in accordance with various embodiments.

In various embodiments, and with reference to FIG. 1, a conventional cabin air compressor system 110 comprising a cabin air compressor motor 120 is depicted. Cabin air compressor motor 120 may draw its air to be compressed from ram air or from a secondary source.

Conventionally, the stators of the cabin air compressor motor 120 are air cooled by air drawn from ram air flow, such as through a ram air flow inlet 145. Ram air flows across the cabin air compressor motor 120 to provide cooling and removal of thermal energy. As used herein the term "ram air" may refer to the principle of using the airflow created by a moving object. The cooling ram air flow for proper cooling of the air compressor motor at operational speed may not be available on an extreme hot day and/or at high altitude, such as 43,000 feet. Also, the cooling ram air flow for proper cooling of the air compressor motor at operational speed may not be available during extreme hot day ambient air ground conditions. Lack of adequate cooling can result in insulation failure. Also, humid air and sea water ingress from the airport environment to the ram air flow may condense within a cooling duct 122 and result in sea water contamination on the stator winding of the cabin air compressor motor 120. Contamination may cause a cabin air compressor motor 120 winding to short. A short and/or high heat production in this fuel rich environment is undesirable. Thus, the fully sealed conduction liquid cooled stator disclosed herein provides a robust solution without the drawbacks of conventional ram air flow cooling systems. For instance, air has a low specific heat and thus is a poor thermal energy transfer medium. Also, ram air may introduce impurities and contaminants into the system.

Figure 2:
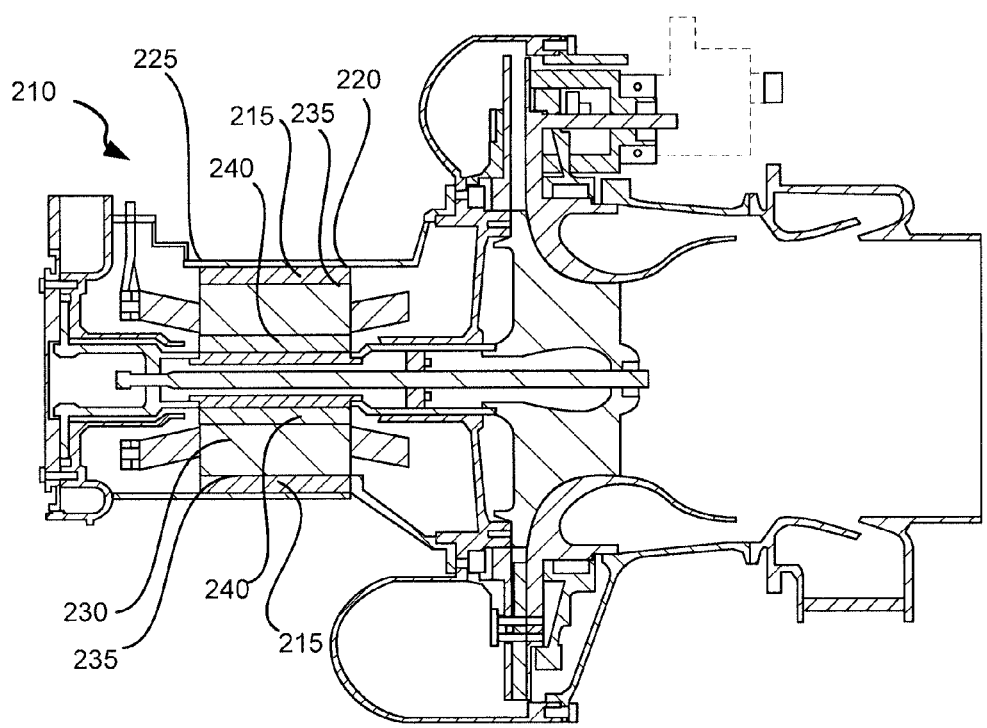
FIG. 2 is a cross-sectional view of a liquid cooled cabin air compressor system in accordance with various embodiments.

According to various embodiments, and with reference to FIG. 2, a liquid cooled stator cooling system 210 of a cabin air compressor motor 220 is depicted. In various embodiments cabin air compressors are centrifugal compressors. Though cabin air compressor motor 220 can take any form, cabin air compressor motor 220 may be a single compressor comprising a three phase, four pole permanent magnet motor on a single shaft. The rotor shaft system may be supported radially by two hydrodynamic foil type journal bearings and axially by a pair of hydrodynamic foil type thrust bearings. In general, the operating speed of cabin air compressor motor 220 may be approximately 20,000 RPM to 41,500 RPM.

With continued reference to FIG. 2, the stator core 230 may be in electrical communication with stator winding 240. The stator core 230 may comprise a back iron portion 235. A portion of liquid cooled stator cooling system 210, such as back iron heat exchanger 215, may transfer thermal energy from the stator core 230 and/or the back iron portion 235. Back iron heat exchanger 215 may be positioned between and coupled to at least one of a motor housing 225 and back iron portion 235.

As compared to an air cooled unit, such as a conventional ram air cooled cabin air compressor system 110 (as depicted in FIG. 1), liquid cooling offers a higher heat transfer coefficient. Stated another way, the heat transfer capacity of the back iron of cabin air compressor motor 220 is enhanced. This may result in cabin air compressor motor 220 operating at a lower temperature, especially at flight altitude (i.e., at or above 35,000 ft. (10,668 m) and at high ambient air temperatures (e.g., at or above 90° F./32° C.). For instance, liquid has a higher density, higher thermal conductivity and a higher specific heat as compared to air, and may extract more heat per unit time which in turn creates increased cooling to the cabin air compressor motor 220 and/or the stators of cabin air compressor motor 220.

The liquid used in the liquid cooled stator cooling system 210 may be any suitable liquid for thermal transfer and/or removal of thermal energy. The liquid used in the liquid cooled stator cooling system 210 may be dielectric (e.g. electrically nonconductive) or the liquid may be at least moderately conductive. Conductive liquid coming into contact with the three phase four pole permanent magnet motor of the cabin air compressor motor 220 is undesirable. Thus, according to various embodiments, the liquid cooled stator cooling system 210 described herein may be a fully sealed heat exchanger, such as a fully sealed back iron heat exchanger (described in further detail below). The liquid used in the liquid cooled stator cooling system 210 may comprise a propylene glycol water mixture, such as DOW FROST, or an ethylene glycol, or poly-alpha-olefin (PAO) liquid.

Figure 3:
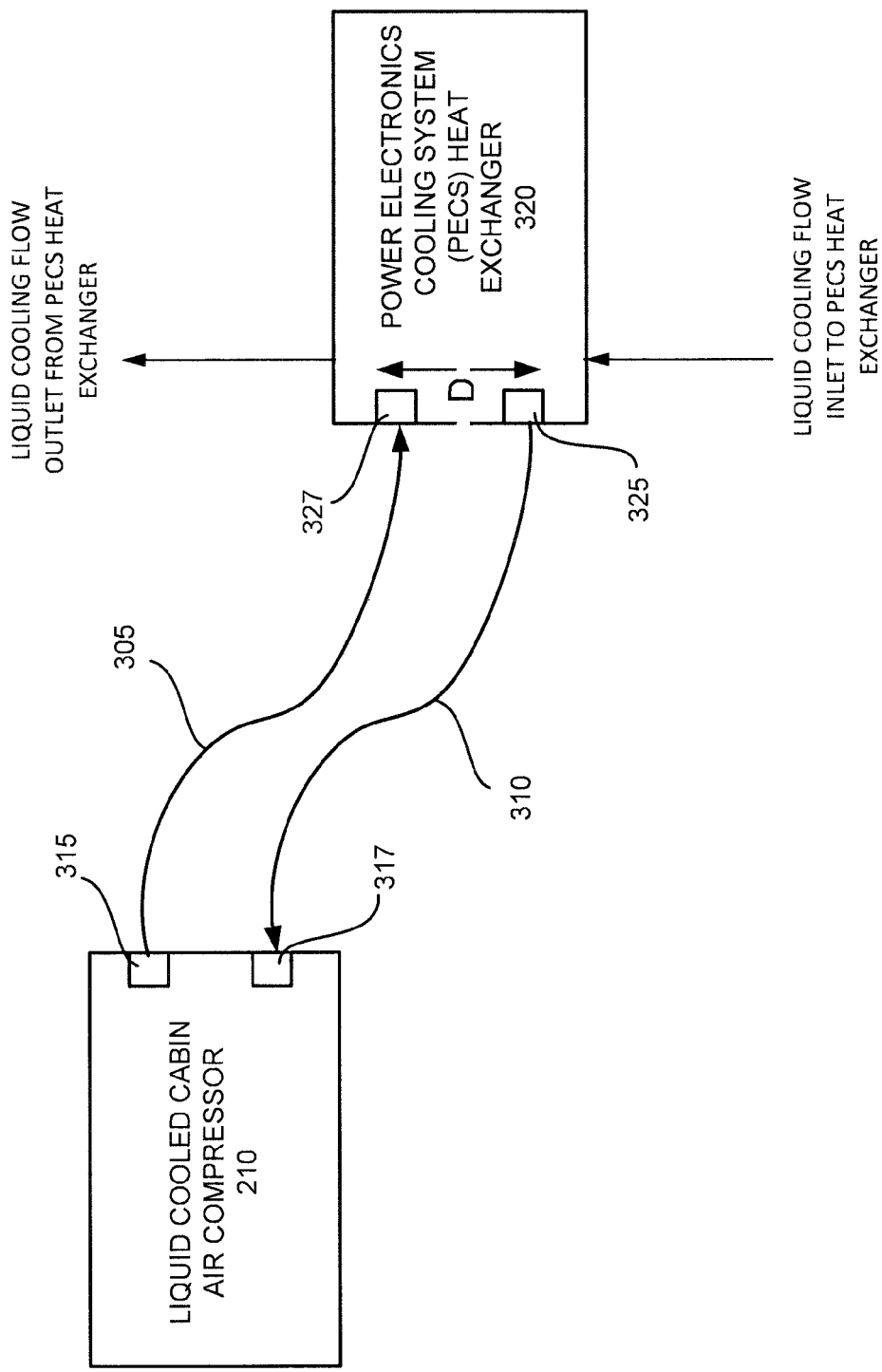
FIG. 3 is a block diagram depicting a source and process loop of cooling liquid a liquid cooled cabin air compressor in accordance with various embodiments.

For instance, and with reference to FIG. 3, the liquid for use in liquid cooled stator cooling system 210 may be drawn from a preexisting source on the aircraft and/or a system dedicated to liquid cooled stator cooling system 210. According to various embodiments, liquid for use in liquid cooled stator cooling system 210 may be drawn from the power electronics cooling system ("PECS") heat exchanger 320. PECS heat exchanger 320 may comprise a liquid return input 327 and a liquid transfer output 325. Similarly, liquid cooled stator cooling system 210 may comprise a liquid input 317 and a liquid transfer output 315. For example, PECS heat exchanger 320 liquid transfer output 325 may be coupled to liquid cooled stator cooling system 210 liquid input 317 via conduit 310. The liquid coolant delivered via conduit 310 may be bypassed from the inlet side of the PECS heat exchanger. Liquid cooled stator cooling system 210 liquid transfer output 315 may be coupled to PECS heat exchanger 320 liquid return input 327 via conduit 305 for the transfer of coolant/liquid. Liquid coolant from the liquid transfer output 315 may be returned to the PECS heat exchanger. Conduits 305 and 310 may be made from any suitable material. Conduits 305 and 310 may be insulated and/or nonconductive. Bypass flow from PECS heat exchanger 320 of about 12 to 16 lb./min for liquid cooled stator cooling system 210 can be driven by a heat exchanger pressure drop. For example, the pressure drop across the liquid cooling flow inlet to the PECS heat exchanger and/or liquid transfer output 325 and the liquid return input 327 may be used to drive flow of liquid cooling fluid through conduit 310.

Stated another way, cooling liquid may flow in a loop from PECS heat exchanger 320 to cabin air compressor motor 220, perform a thermal energy transfer, and then return from cabin air compressor motor 220 to PECS heat exchanger 320. This arrangement has little to no effect on the PECS heat exchanger 320 heat load. According to various embodiments, a pump may be coupled to liquid cooled stator cooling system 210 for the transfer of cooling liquid between a coolant source, such as PECS heat exchanger 320 and/or a secondary source and elements of cabin air compressor motor 220.

Figure 4:
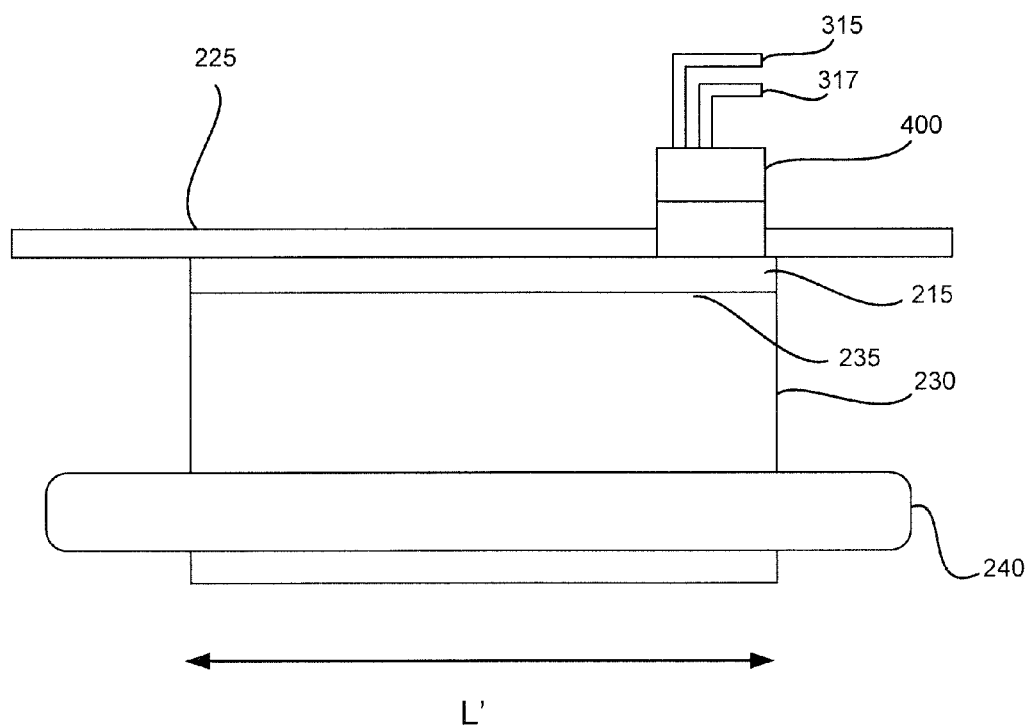
FIG. 4 is representative cross-sectional depiction of a cabin air compressor motor coupled to a liquid cooled heat exchanger in accordance with various embodiments.

According to various embodiments and with reference to FIG. 4, the coupling of PECS heat exchanger 320 liquid transfer output 325 to liquid cooled stator cooling system 210 liquid input 317 and/or liquid cooled stator cooling system 210 liquid transfer output 315 to PECS heat exchanger 320 liquid return input 327 may be made via a quick disconnect coupling. This quick disconnect coupling may take any form however, in various embodiments, utilization of the quick disconnect coupling 400 disconnects liquid input 317 and a liquid transfer output 315 substantially in tandem.

With continued reference to FIG. 4, a representative depiction of the back iron heat exchanger 215 of liquid cooled stator cooling system 210 is shown. While it may be located in any suitable location, back iron heat exchanger 215 may be located between the motor housing 225 and at least a portion of the stator core 230. As will be appreciated by one skilled in the art, the stator core 230 is positioned adjacent to and in electrical communication with the stator winding 240.

Back iron heat exchanger 215 may be coupled, such as by being press fit, to a portion of stator back iron portion 235. Also, back iron heat exchanger 215 may be coupled to, such as by being press fit, and/or housed within the motor housing 225. Cooling inlet 317 and cooling output, 315 (as depicted in FIGS. 3 and 4) allow back iron heat exchanger 215 to be connected by a quick disconnect coupling 400. Cooling flow can be drawn from the PECS heat exchanger 320 using a bypass flow. For instance, about 12-20 lb./min of cooling flow may provide adequate cooling in various operating conditions.

Figure 5A:
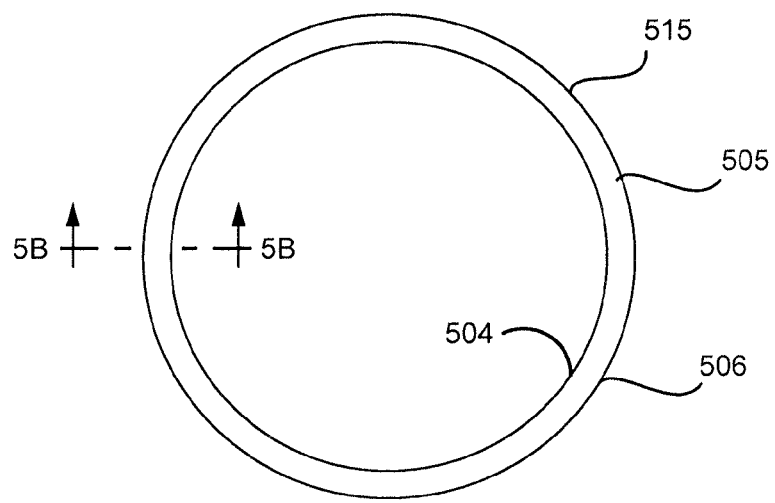
FIG. 5A is a side view of a liquid cooled heat exchanger, in accordance with various embodiments.
Figure 5B:
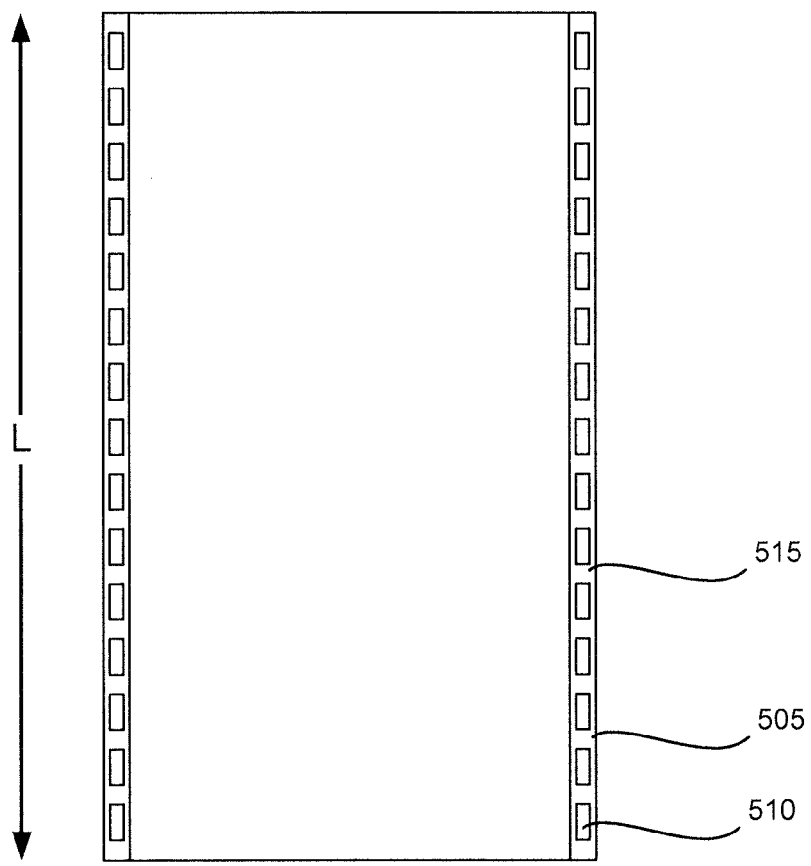
FIG. 5B cross-sectional view of the liquid cooled heat exchanger of FIG. 5A along cut plane C, in accordance with various embodiments.

According to various embodiments, and with reference to FIGS. 5A and 5B, liquid cooled stator cooling system 210 may comprise a back iron heat exchanger 215, such as a fully sealed annular heat exchanger 515 comprising liquid cooling channels 510. In this way, the dielectric properties of the liquid used in the liquid cooled stator cooling system 210 may be rendered immaterial to cooling liquid selection. Stated another way, the fully sealed annular heat exchanger 515 may be electrically nonconductive. Also, fully sealed annular heat exchanger 515 may insulate the liquid cooling channels 510 and the liquid they transfer from contact with the electrical elements of cabin air compressor motor 220. The liquid cooling channels 510 may be connected in series and/or together. The liquid cooling channels 510 may be substantially parallel to each other and coupled together. Stated another way, channels 510 may be annular rings coupled together. According to various embodiments, the liquid cooling channels 510 may be oriented in any suitable position and/or orientation, such as a corkscrew, geometric, wavy or random pattern.

The interior diameter surface 504 of the generally annular heat exchanger 515 may be in close proximity to, making contact with and/or adjacent to portions of stator core 230 of cabin air compressor motor 220. Though generally curved, interior diameter surface 504 may be shaped to mirror and/or complement the interior diameter and/or an exterior surface of the back iron of the stator core 230. The exterior diameter surface 506 of the generally annular heat exchanger 515 may be in close proximity to, making contact with and/or adjacent to portions of the motor housing 225 of cabin air compressor motor 220. Though generally curved, exterior diameter surface 506 may be shaped to mirror and/or complement an interior surface of motor housing 225. The length L of annular heat exchanger 515 may be longer than the length L' (as shown in FIG. 4) of the stator core 230 of cabin air compressor motor 220, more than the length L' of the stator core 230 of cabin air compressor motor 220 or less than the length L' of the stator core 230 of cabin air compressor motor 220.

Figure 6A:
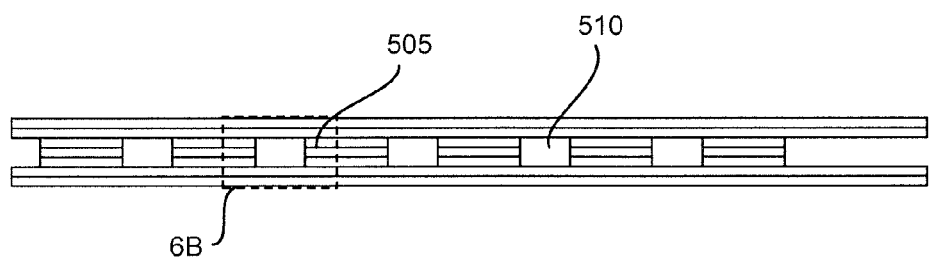
FIGS. 6A and 6B depict cross-sectional close-up views of the channels of the liquid cooled heat exchanger manufactured through additive manufacturing, in accordance with various embodiments.
Figure 6B:
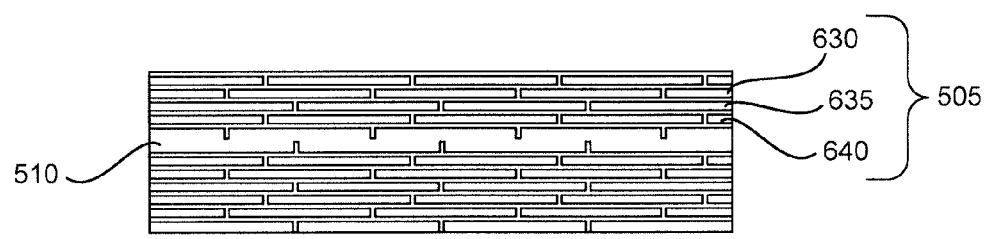

Liquid cooling channels 510 may be "grown" through ultrasonic additive machining ("UAM"). In this way, sound waves are used to merge layers of metal drawn from stock material. The process produces metallurgical bonds with full density. Metals such as aluminum, copper, stainless steel, and titanium may be used in the UAM process. With reference to FIGS. 6A and 6B. The merged, stacked layers 630, 635, 640 may be staggered to create three dimensional partitions, collectively 505 which define electrically insulated liquid cooling channels 510 of fully sealed annular heat exchanger 515. Thus the term "fully sealed" as used herein may refer to the liquid cooling channels 510 being electrically insulated. Cooling liquid may pass through these liquid cooling channels 510 to absorb heat and transfer thermal energy away from elements of cabin air compressor motor 220, such as stator core 230.

Stated another way, the UAM process utilized herein, such as for example for rapid prototyping of the fully sealed annular heat exchanger 515, involves ultrasonically welding a succession of metal tapes into a three-dimensional shape. This three dimensional shape may be machined periodically to create the fully sealed annular heat exchanger 515 comprising liquid cooling channels 510. For instance, vibrations of a transducer are transmitted to a disk-shaped welding horn, which in turn creates an ultrasonic solid-state weld between a metal tape and a base plate. Continuous rolling of the horn over the plate welds the tape to the plate. The result in this case is a fully sealed annular heat exchanger 515.

According to various embodiments, cabin air compressor motor 220 comprises bearings and rotors which also generate heat during normal use. These elements may be cooled by diverting air from the cabin air compressor motor 220 itself. Thus, ram air is not being utilized to cool elements of the cabin air compressor motor 220 but rather compressed air and liquid cooling in combination is used in combination to provide cooling to cabin air compressor motor 220.

According to various embodiments, ram air, secondary air sources, and/or liquid cooling alone or in combination are used to provide cooling to cabin air compressor motor 220.

Liquid cooled cabin air compressor motor 220 comprises an increased stator insulation life and increased cabin air compressor operational reliability as compares with conventional cabin air compressors. In addition, a fully sealed liquid cooled cabin air compressor motor 220 stator may not be cooled via cooling duct/RAM duct 122 and/or ram air. This enables no contamination of humid air, foreign object damage, sea water contamination, and/or the like to cause damage, such as stator electrical shorts in the unit.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A liquid cooled stator cooling system, comprising:
an aircraft cabin air compressor motor comprising:
a motor housing and a stator core, wherein a liquid cooled back iron heat exchanger is positioned between the motor housing and the stator core;
wherein the liquid cooled back iron heat exchanger comprises a plurality of substantially parallel layers that create substantially parallel channels connected in series, wherein the layers are straight in a direction parallel to a length of the stator core.

2. The liquid cooled stator cooling system of claim 1, wherein the liquid cooled back iron heat exchanger is electrically nonconductive.

3. The liquid cooled stator cooling system of claim 1, wherein a liquid of the liquid cooled back iron heat exchanger is electrically conductive.

4. The liquid cooled stator cooling system of claim 1, wherein a liquid of the liquid cooled back iron heat exchanger comprises a propylene glycol water mixture.

5. The liquid cooled stator cooling system of claim 1, wherein a liquid of the liquid cooled back iron heat exchanger comprises ethylene glycol polyolefin liquid.

6. The liquid cooled stator cooling system of claim 1, wherein a liquid of the liquid cooled back iron heat exchanger is provided by a power electronics cooling system heat exchanger.

7. The liquid cooled stator cooling system of claim 1, wherein the liquid cooled back iron heat exchanger is produced through additive manufacturing.

8. The liquid cooled stator cooling system of claim 1, wherein the liquid cooled stator cooling system is free of ambient air contaminates for thermal energy transfer between the liquid cooled back iron heat exchanger and the stator core.

9. The liquid cooled stator cooling system of claim 1, wherein the liquid cooled back iron heat exchanger is a fully sealed unit.

10. The liquid cooled stator cooling system of claim 1, wherein the liquid cooled back iron heat exchanger comprises a generally annular shape.

11. A liquid cooled back iron heat exchanger comprising:
a plurality of channels configured to transfer cooling liquid, wherein the plurality of channels are defined by an additive manufacturing layer structure comprising a plurality of substantially parallel layers that are straight in a direction parallel to a length of the liquid cooled back iron heat exchanger.

12. The liquid cooled back iron heat exchanger of claim 11, wherein the liquid cooled back iron heat exchanger comprises a plurality of substantially parallel channels connected in series.

13. The liquid cooled back iron heat exchanger of claim 11, wherein the liquid cooled back iron heat exchanger is electrically nonconductive.

14. The liquid cooled back iron heat exchanger of claim 11, wherein the cooling liquid of the liquid cooled back iron heat exchanger is electrically conductive.

15. The liquid cooled back iron heat exchanger of claim 11, wherein the cooling liquid of the liquid cooled back iron heat exchanger comprises a propylene glycol water mixture.

16. The liquid cooled back iron heat exchanger of claim 11, wherein the cooling liquid of the liquid cooled back iron heat exchanger is provided by a power electronics cooling system heat exchanger.

17. The liquid cooled back iron heat exchanger of claim 11, wherein an inlet of the liquid cooled back iron heat exchanger and an outlet of the liquid cooled back iron heat exchanger are disengaged via a quick disconnect coupling.

18. The liquid cooled back iron heat exchanger of claim 11, wherein the liquid cooled back iron heat exchanger comprises a generally annular shape.

19. A method of manufacturing a nonconductive liquid cooled back iron heat exchanger to house a conductive cooling liquid, the method comprising;
forming layers of material via additive manufacturing to create channels for transporting cooling liquid, wherein the layers are straight in a direction parallel to a length of the liquid cooled back iron heat exchanger, parallel, and staggered to create a plurality of substantially parallel electrically insulated channels; and
providing the cooling liquid from a power electronics cooling system heat exchanger via a pressure drop between a power electronics cooling system heat exchanger and the back iron heat exchanger.

\* \* \* \* \*